H. D. GRANT.
DRAFT EQUALIZER.
APPLICATION FILED OCT. 17, 1910.
1,010,253.
Patented Nov. 28, 1911.
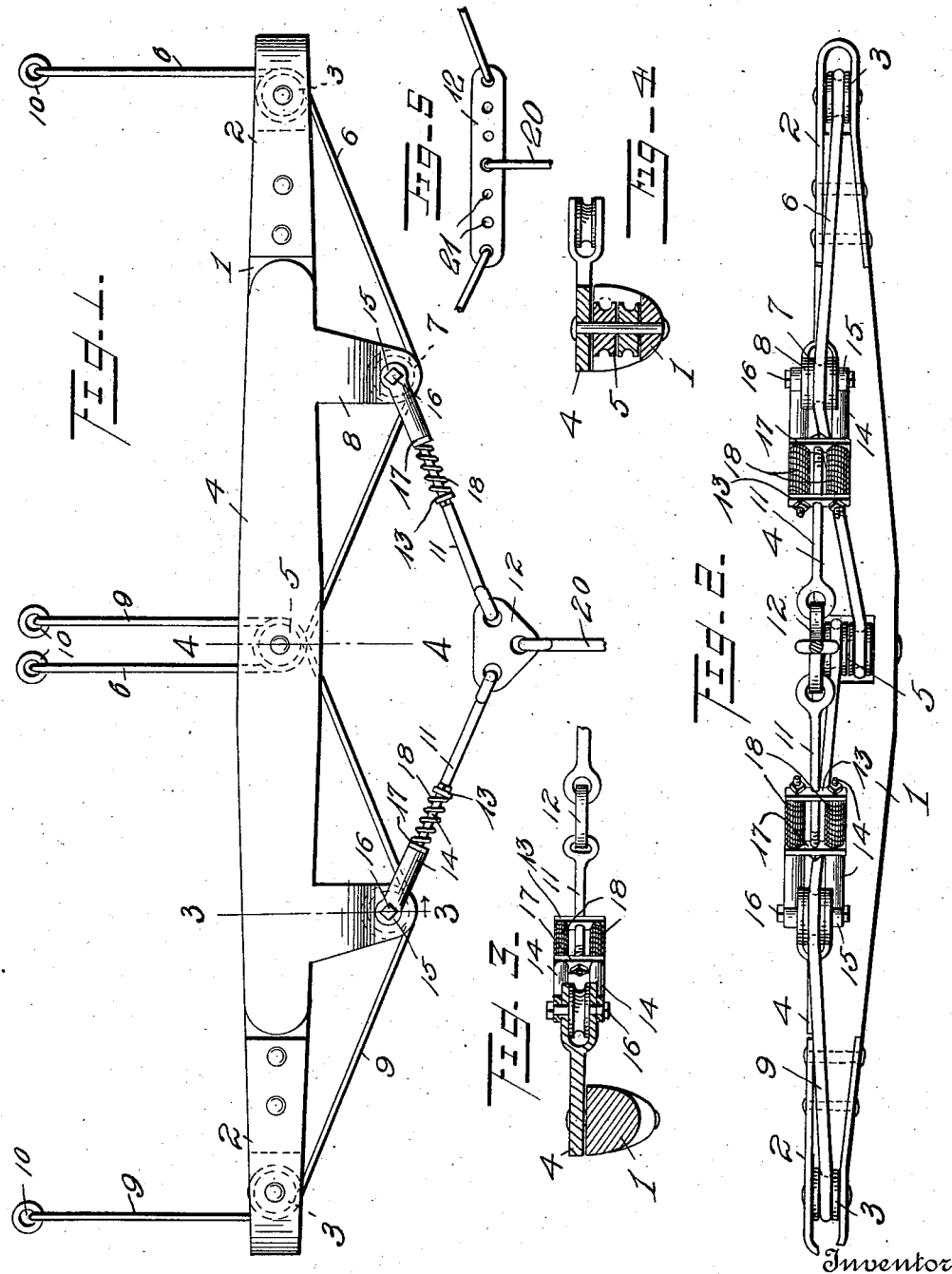
Witnesses
Inventor
H. D. Grant
by H. B. Willson & Co.
Attorneys

UNITED STATES PATENT OFFICE.

HUGH D. GRANT, OF WEISER, IDAHO.

DRAFT-EQUALIZER.

1,010,253.  Specification of Letters Patent.  Patented Nov. 28, 1911.

Application filed October 17, 1910. Serial No. 587,470.

*To all whom it may concern:*

Be it known that I, HUGH D. GRANT, a citizen of the United States, residing at Weiser, in the county of Washington and State of Idaho, have invented certain new and useful Improvements in Draft-Equalizers; and I do declare the following to be a full, clear, and exact description of the invention, such as will enable others skilled in the art to which it appertains to make and use the same.

This invention relates to draft equalizers and has for an object to provide an equalizer which will evenly and proportionately distribute the draft upon all of the draft animals.

Another object is to provide means for connecting the draft equalizing bar so as to throw the greater portion of the burden upon one or more of the animals, as desired.

With the foregoing and other objects in view the invention consists of certain novel features of construction, combination and arrangements of parts as will be more fully described and pointed out in the appended claims.

In the accompanying drawings, Figure 1 is a plan view of my improved draft equalizing mechanism. Fig. 2 is a rear elevation thereof. Figs. 3 and 4 are transverse sections taken on the line 3—3 and 4—4 of Fig. 1, respectively. Fig. 5 is a detail plan view of the adjustable draft link.

Referring particularly to the drawings, my improved equalizer comprises a main bar 1, to the opposite ends of which are attached pulley supporting plates or bearings 2 in which pulleys 3 are suitably mounted. The upper or supplemental equalizer bar 4 is pivoted at its center to the main bar 1 and suitably arranged between the bars 1 and 4 substantially at the center of said bars are one or more grooved pulleys 5. Bearings 8 having pulleys 7 mounted therein are arranged adjacent each end of the supplemental bar 4.

A flexible draft cable, wire or like traction element 6 is arranged to pass over one of the pulleys 3, around the pulley 7 mounted in one of the bearing 8 extending from the bar 4 and over one of the grooved pulleys 5. A second draft cable or like traction element 9 is arranged to pass over the pulley 3 on the opposite end of the equalizer bar, the other pulley 7 and one of the pulleys 5, as clearly shown in Fig. 1.

The ends of the cables 6 and 9 are provided with suitable means, as 10, for hitching the draft animals thereto. A pair of connecting links 11 are arranged with their inner ends connected to an intermediate link 12, adapted to be suitably connected with the vehicle by the draft bar 20. At their outer ends the links 11 are provided with a cross bar 13 having spaced apertures therein through which extend the rods 14, which are pivotally mounted, as at 15, upon the pin or bolt 16, extending through the bearings 8. Rods 14 also pass through a cross bar 17, and suitable resilient means, such as the coiled springs 18, are interposed between the cross bars 13 and 17 respectively to assist in taking up any sudden movement or jerks occurring during the travel of the vehicle. In Fig. 5 is illustrated an adjustable link 12 provided with a plurality of spaced openings or slots 21 therein, through any of which may be connected the draft bar 20. It will be apparent that by changing the draft bar from one of said apertures to another, a greater or less proportion of the weight of the vehicle will be transferred to one side of the draft equalizing mechanism. By this means the greater portion of the burden may be shifted upon any one or more of the draft animals as required, the other of said animals being relieved of a considerable portion of the weight of the vehicle.

It is believed that the operation and use of the herein described equalizing mechanism will be readily apparent without any further description.

Various changes in the form, proportion and the minor details of construction may be resorted to without departing from the principle or sacrificing any of the advantages of this invention as defined in the appended claims.

What is claimed is:

1. A draft equalizer comprising a main bar, a supplemental bar pivotally mounted thereon, pulleys at opposite ends of the main bar, pulleys mounted adjacent the opposite ends of the supplemental bar, pulleys between said bars at the center of the draft equalizer and traction elements passing over said pulleys.

2. A draft equalizer comprising a main bar, a supplemental bar pivotally mounted thereon, pulleys adjacent the ends of the main and supplemental bars, pulleys between said bars arranged substantially at the center of the equalizer, attaching elements passing over said pulleys, and means for connecting the supplemental bar with the vehicle including pivotal yielding links between the supplemental bar and the vehicle.

3. A draft equalizer comprising a main bar, a supplemental bar pivotally mounted thereon, pulleys adjacent the ends of the main and supplemental bar, pulleys between said bars substantially at the center of the equalizer, a plurality of cables passing over said pulleys, bearings extending from the supplemental bar adjacent its ends, connecting links extending from said bearings, an intermediate link connecting said links, means for connecting the intermediate link with the vehicle and resilient elements arranged to oppose the movement of said connecting links.

In testimony whereof I have hereunto set my hand in presence of two subscribing witnesses.

HUGH D. GRANT.

Witnesses:
JOHN MCCAFFEREY,
JAMES D. GRANT.

---

Copies of this patent may be obtained for five cents each, by addressing the "Commissioner of Patents, Washington, D. C."